(12) United States Patent
Lee

(10) Patent No.: US 8,988,408 B2
(45) Date of Patent: Mar. 24, 2015

(54) VARIABLE-BIAS POWER SUPPLY

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1148 days.

(21) Appl. No.: 12/839,104

(22) Filed: Jul. 19, 2010

(65) Prior Publication Data

US 2011/0227901 A1    Sep. 22, 2011

Related U.S. Application Data

(60) Provisional application No. 61/316,195, filed on Mar. 22, 2010.

(51) Int. Cl.
*G06F 3/038*    (2013.01)
*G06F 1/32*    (2006.01)

(52) U.S. Cl.
CPC .......... *G06F 1/3203* (2013.01); *G06F 1/3218* (2013.01)
USPC ......................................... 345/212

(58) Field of Classification Search
CPC ............. G09G 5/10; G09G 5/02; G09G 3/36; G09G 5/00; G09G 3/3677; G09G 3/3696; G09G 2310/0289; G09G 2310/066; G09G 2330/0219; G05F 1/10; G05F 1/575; G90G 3/3648; G90G 2320/0247; G90G 2300/0465
USPC ................... 345/211–213, 1.1–1.3
See application file for complete search history.

(56) References Cited

U.S. PATENT DOCUMENTS

| | | | |
|---|---|---|---|
| 5,444,358 A | 8/1995 | Delepaut | |
| 6,873,322 B2 | 3/2005 | Hartular | |
| 2002/0130646 A1* | 9/2002 | Zadeh et al. | 323/275 |
| 2005/0088379 A1* | 4/2005 | Tsuchida | 345/76 |
| 2005/0093488 A1 | 5/2005 | Hung et al. | |
| 2006/0043947 A1 | 3/2006 | Clavette et al. | |
| 2011/0012891 A1* | 1/2011 | Cheng et al. | 345/214 |

* cited by examiner

*Primary Examiner* — Tony N Ngo
(74) *Attorney, Agent, or Firm* — Fletcher Yoder PC

(57) ABSTRACT

A responsive, low-power display panel power supply is provided. In one embodiment, such a display panel power supply may include a regulator whose responsiveness varies depending on the bias current it consumes, and a current source that provides a variable bias current. The regulator may provide the display panel a supply voltage and a supply current based on a reference voltage and a bias current. Various events taking place in the display panel, such as toggling at COM lines, source lines, and/or gate lines may cause parasitic capacitances within the display panel to draw more or less supply current. To ensure the regulator remains suitably responsive to such changes in supply current, while reducing the total power consumed by the power supply, the current source may provide a higher bias current to the regulator at least while the supply current is changing than at certain other times.

12 Claims, 8 Drawing Sheets

VARIABLE-BIAS POWER SUPPLY

CROSS REFERENCE TO RELATED APPLICATION

This application claims the benefit of U.S. Provisional Patent Application No. 61/316,195, entitled "VARIABLE-BIAS POWER SUPPLY," filed Mar. 22, 2010, which is incorporated by reference herein in its entirety.

BACKGROUND

The present disclosure relates generally to power supplies for electronic devices and, more particularly, to power supplies for display panels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Flat panel displays, such as liquid crystal displays (LCDs) and organic light emitting diode (OLED) displays are commonly used in a wide variety of electronic devices, including such consumer electronics as televisions, computers, and handheld devices (e.g., cellular telephones, audio and video players, gaming systems, and so forth). Such display panels typically provide a flat display in a relatively thin package that is suitable for use in a variety of electronic goods. In addition, such devices typically use less power then comparable display technologies, making them suitable for use in battery-powered devices or in other contexts where it is desirable to minimize power usage.

Display panel power supplies may include a low dropout (LDO) regulator that provides a supply voltage and a supply current based on a reference voltage and a bias current. The responsiveness of the regulator to changes in the amount of supply current drawn by the display panel may depend in part on the amount of bias current supplied to the regulator. In particular, the higher the bias current, the more rapidly the regulator may respond to changes in the supply current. However, the higher the bias current, the more power consumed by the power supply.

A variety of events undertaken by the display panel may cause the display panel to consume varying amounts of supply current at any given time. For example, toggling at COM lines, source lines, and gate lines in the display panel may produce spikes in the amount of supply current drawn by the display panel. To ensure that the display panel power supply is sufficiently responsive despite such supply current fluctuations, the LDO regulator of the display panel power supply may be provided with a relatively high bias current at all times, which may consume a relatively high amount of power.

Additionally, different display panels may be more likely to consume variable amounts of power. For example, a display panel manufactured by one vendor may draw more power when certain events occur (e.g., the display panel may operate in a manner that draws large swings of supply current) than a display panel manufactured by another vendor. As a result, a bias current sufficient for one display panel may not be sufficient for another display panel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to responsive, low-power display panel power supplies. In one embodiment, such a display panel power supply may include a regulator whose responsiveness varies depending on the bias current it consumes, and a current source that provides a variable bias current. The regulator may provide the display panel a supply voltage and a supply current based on a reference voltage and a bias current. Various events taking place in the display panel, such as toggling at COM lines, source lines, and/or gate lines may cause parasitic capacitances within the display panel to draw more or less supply current. To ensure the regulator remains suitably responsive to such changes in supply current, while reducing the total power consumed by the power supply, the current source may provide a higher bias current to the regulator at least while the supply current is changing than at certain other times.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
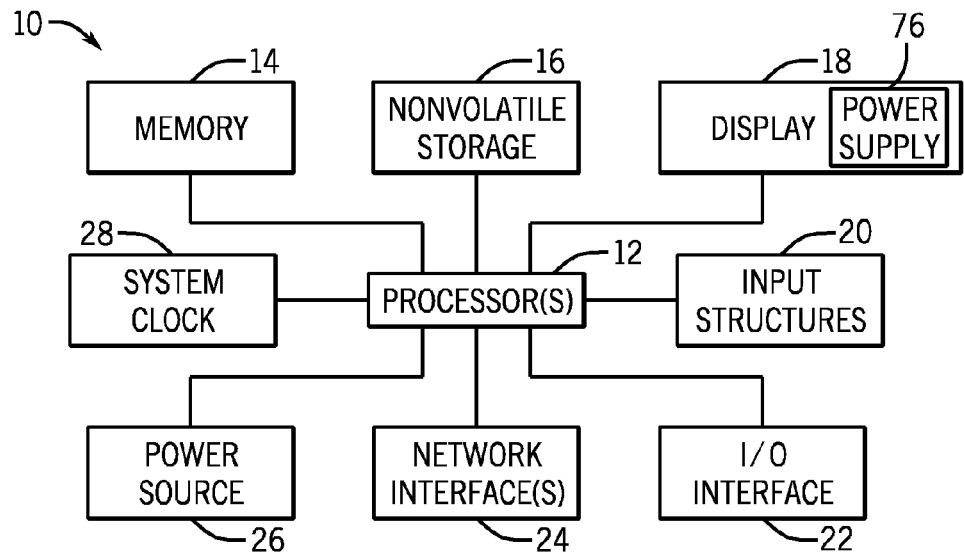
FIG. 1 is a block diagram of components of an electronic device in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to techniques for providing a variable bias current for a display panel power supply for low-power operation. In particular, rather than provide a relatively high bias current to the display panel power supply at all times, which may ensure the display panel power supply supplies sufficient current, but which also may consume excessive power, present techniques may involve supplying a reduced bias current when certain events known to cause supply current variations are not occurring. Such events may include, for example, display panel operations and capacitive coupling internal to the display panel, which may generate current spikes across the display panel.

In accordance with certain embodiments, a change in the amount of supply current drawn by the display panel may be detected. In response, the bias current to the display panel power supply may be temporarily increased, which may enable the display panel power supply to be more responsive. Additionally or alternatively, the bias current provided to the display panel power supply may be varied based on when the amount of supply current drawn by the display panel is expected to fluctuate. For example, supply current may change in response to certain events occurring internal to the display panel. If such events may be predicted, the amount of supply current drawn by the display panel similarly may be predicted. By way of example, since such events may occur when electronic components in the display panel perform certain operations, and since such operations may take place in response to rising and/or falling edges of a clock signal, the supply current may spike at these times. Accordingly, the bias current may be temporarily raised to account for such current spikes around the rising and falling edges of the clock signal.

In some embodiments, the bias current provided to the display panel power supply may be preset based on characteristics of the display. For example, certain display panels (e.g., display panels manufactured by a first vendor) may consume supply current in a more variable manner than certain other display panels (e.g., display panels manufactured by a second vendor). Depending on such characteristics of the display panel, a programmable register associated with the display panel power supply may be programmed to define the bias current. Thereafter, a bias current controller may provide the bias current to the display panel power supply based on the information programmed in the register.

With the foregoing in mind, FIG. 1 represents a block diagram of such an electronic device 10 capable of performing the techniques disclosed herein. Among other things, the electronic device 10 may include processor(s) 12, memory 14, nonvolatile storage 16, a display 18 having associated display panel power supplies 76, input structures 20, an input/output (I/O) interface 22, network interface(s) 24, a power source 26, and/or a system clock 28. In alternative embodiments, the electronic device 10 may include more or fewer components.

In general, the processor(s) 12 may govern the operation of the electronic device 10. In some embodiments, based on instructions loaded into the memory 14 from the nonvolatile storage 16, the processor(s) 12 may control the amount of bias current provided to a power supply of the display 18, as discussed below. In addition to these instructions, the nonvolatile storage 16 also may store a variety of data. By way of example, the nonvolatile storage 16 may include a hard disk drive and/or solid state storage, such as Flash memory.

The display 18 may be a flat panel display, such as a liquid crystal display (LCD) or an organic light emitting diode (OLED) display. The display panel power supplies 76 may be integral components of the display 18 or may be located elsewhere in the electronic device 10. In general, the display panel power supplies 76 may supply power to certain components of the display 18 (e.g., COM, data, and gate lines), as discussed below. Various operations undertaken by the display 18 may draw varying amounts of supply current at certain times. In some embodiments, to ensure that the display panel power supplies 76 are sufficiently responsive to such supply current fluctuations, while reducing the amount of power consumed by the display panel power supplies 76, the amount of bias currents provided to the display panel power supplies 76 may be varied, as discussed in greater detail below. In certain other embodiments, the bias currents supplied to the display panel power supplies 76 may be static, but may be selected based on certain supply current consumption characteristics of the display 18.

A user may control the electronic device 10 using input structures 20, which may include a touch-sensitive display 18. The I/O ports 22 of the electronic device 10 may enable the electronic device 10 to transmit data to and receive data from other electronic devices 10 and/or various peripheral devices, such as external keyboards or mice. The network interface(s) 24 may enable personal area network (PAN) integration (e.g., Bluetooth), local area network (LAN) integration (e.g., Wi-Fi), and/or wide area network (WAN) integration (e.g., 3G). The power source 26 of the electronic device 10 may be any suitable source of power, such as a rechargeable lithium polymer (Li-poly) battery and/or alternating current (AC) power converter. By employing the presently-disclosed techniques, the electronic device 10 may reduce the amount of power consumed from the power source 26.

The system clock 28 may generate a master clock signal used by the various components of the electronic device 10. Since the various circuitry of the electronic device 10, including the display 18, may be operative upon a rising and/or falling edge of the master clock signal, the supply current drawn by the display 18 may spike at these times. Accordingly, as mentioned above, the display 18 may draw a changed amount of supply current upon the rising and/or falling edge of the master clock signal or any similar time source of the electronic device 10, as discussed below. As also discussed below, the bias currents in the power supplies 76 of the display 18 may be increased and/or decreased in relation to the clock signal of the system clock 28. The system clock 28 may be a separate component of the electronic device 10, a component of the processor(s) 12, or a component of any other of the various circuitry of the electronic device 10.

Figure 2:
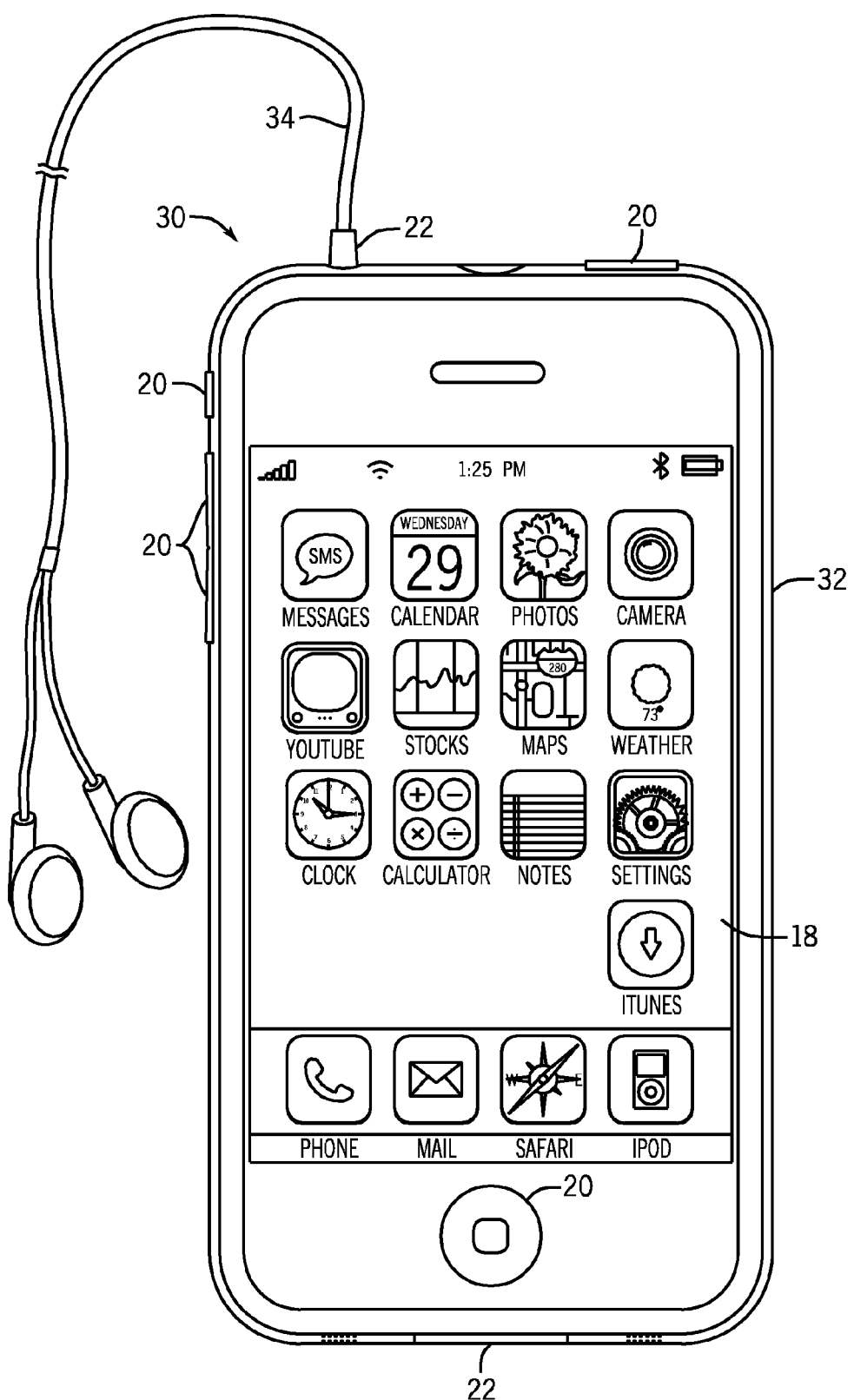
FIG. 2 is a front view of a handheld electronic device in accordance with an embodiment.

FIG. 2 illustrates an electronic device 10 in the form of a handheld device 30, here a cellular telephone. It should be noted that while the handheld device 30 is provided in the context of a cellular telephone, other types of handheld devices (such as media players for playing music and/or video, personal data organizers, handheld game platforms, and/or combinations of such devices) may also be suitably provided as the electronic device 10. Further, the handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld device 30 may also communicate with other devices using short-range connections, such as Bluetooth and near field communication (NFC). By way of example, the handheld device 30 may be a model of an iPod® or iPhone® available from Apple Inc. of Cupertino, Calif.

The handheld device 30 may include an enclosure 32 or body that protects the interior components from physical damage and shields them from electromagnetic interference. The enclosure 32 may be formed from any suitable material, such as plastic, metal or a composite material, and may allow certain frequencies of electromagnetic radiation to pass through to wireless communication circuitry within handheld device 30 to facilitate wireless communication. The enclosure 32 may also include user input structures 20 through which a user may interface with the device. Each user input structure 20 may be configured to help control a device function when actuated. For example, in a cellular telephone implementation, one or more input structures 20 may be configured to invoke a "home" screen or menu to be displayed, to toggle between a sleep and a wake mode, to silence a ringer for a cell phone application, to increase or decrease a volume output, and so forth.

The display 18 in the depicted embodiment of the handheld device 30 is an LCD panel. The display 18 may display a graphical user interface (GUI) that allows a user to interact with the handheld device 30. Icons of the GUI may be selected via a touch screen included in the display 18, or may be selected by one or more input structures 20, such as a wheel or button. The handheld device 30 also may include various I/O ports 22 that allow connection of the handheld device 30 to external devices. For example, one I/O port 22 may be a port that allows the transmission and reception of data or commands between the handheld device 30 and another electronic device, such as a computer. Such an I/O port 22 may be a proprietary port from Apple Inc. or may be an open standard I/O port. Another I/O port 22 may include a headphone jack to allow a headset 34 to connect to the handheld device 30.

Figure 3:
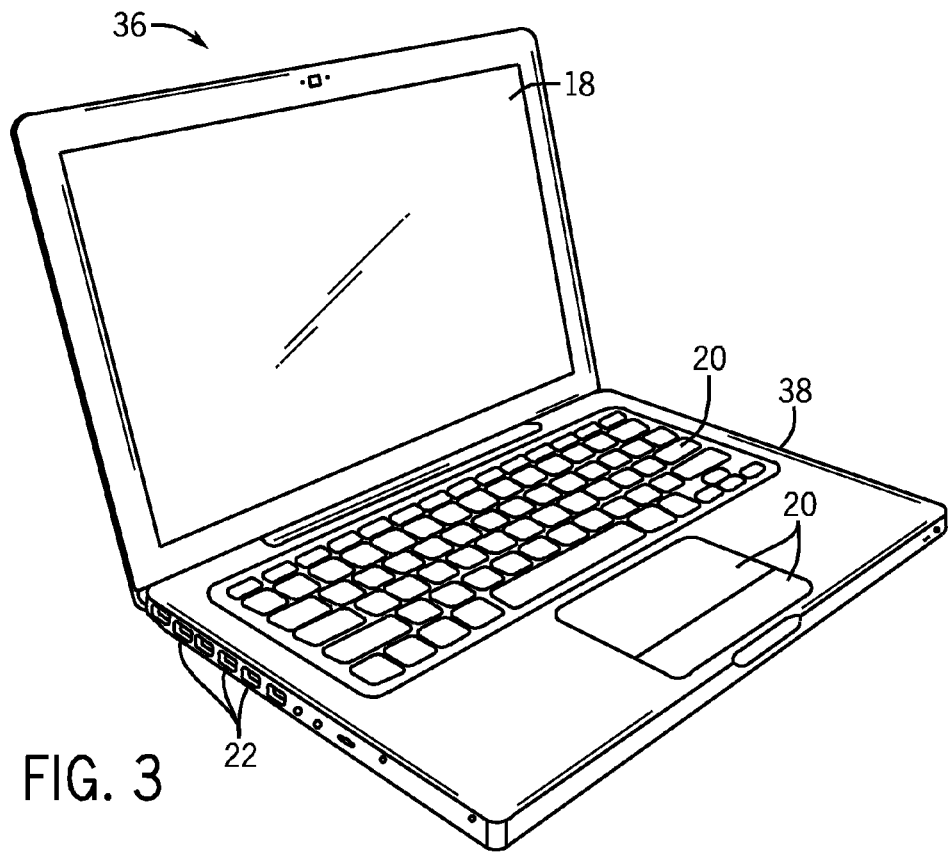
FIG. 3 is a perspective view of a notebook computer in accordance with an embodiment.

In addition to the handheld device 30 of FIG. 2, the electronic device 10 may also take the form of a computer or other type of electronic device. Such a computer may include a computer that is generally portable (such as a laptop, notebook, and/or tablet computer) and/or a computer that is generally used in one place (such as a conventional desktop computer, workstation and/or servers). In certain embodiments, the electronic device 10 in the form of a computer may be a model of a MacBook®, MacBook® Pro, MacBook Air®, iMac®, Mac® mini, or Mac Pro® available from Apple Inc. In another embodiment, the electronic device 10 may be a tablet computing device, such as an iPad® available from Apple Inc. By way of example, a laptop computer 36 is illustrated in FIG. 3 and represents an embodiment of the electronic device 10 in accordance with one embodiment of the present disclosure. Among other things, the computer 36 includes a housing 38, a display 18, input structures 20, and I/O ports 22.

In one embodiment, the input structures 22 (such as a keyboard and/or touchpad) may enable interaction with the computer 36, such as to start, control, or operate a GUI or applications running on the computer 36. For example, a keyboard and/or touchpad may allow a user to navigate a user interface or application interface displayed on the display 18. Also as depicted, the computer 36 may also include various I/O ports 22 to allow connection of additional devices. For example, the computer 36 may include one or more I/O ports 22, such as a USB port or other port, suitable for connecting to another electronic device, a projector, a supplemental display, and so forth. In addition, the computer 36 may include network connectivity, memory, and storage capabilities, as described with respect to FIG. 1.

Figure 4:
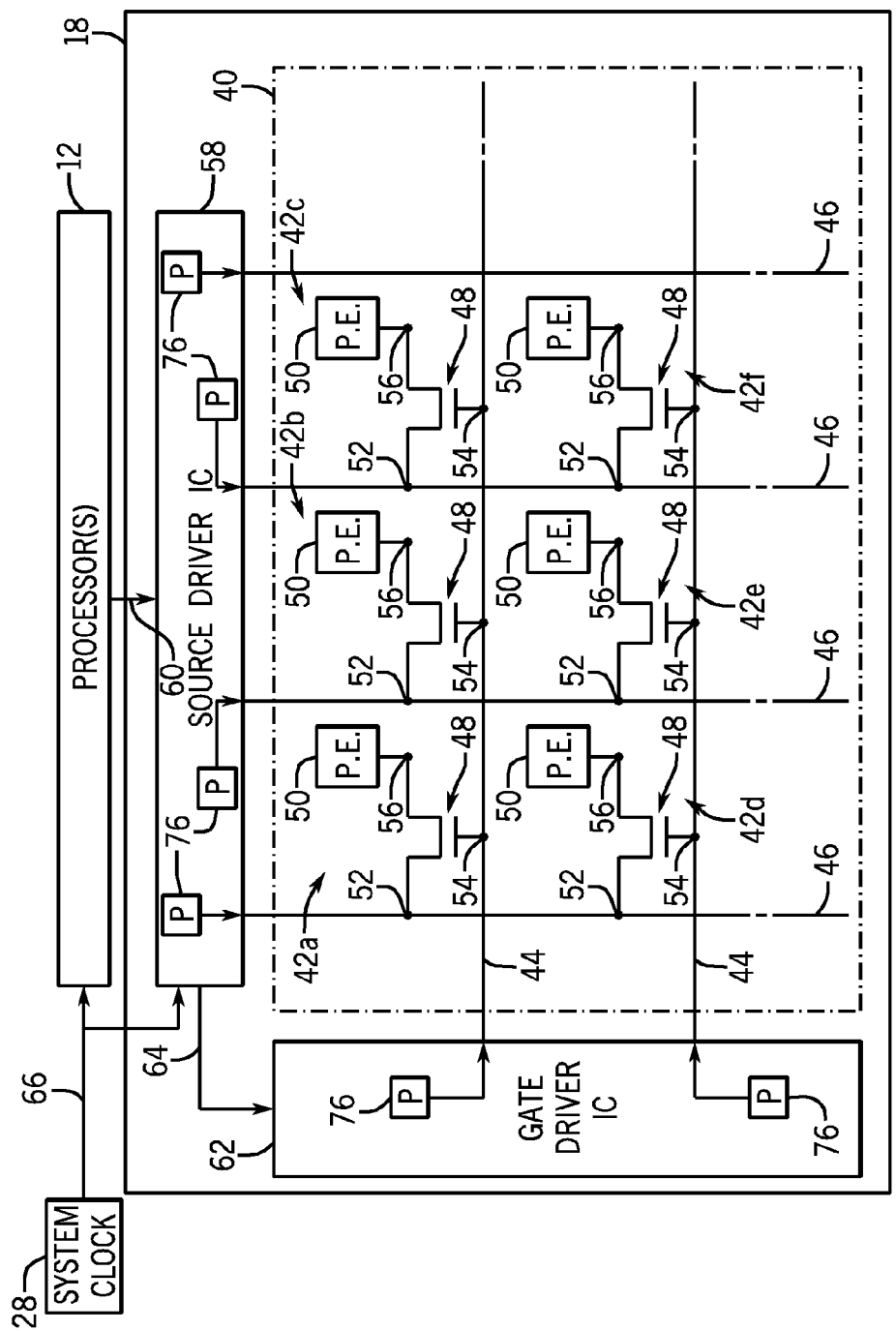
FIG. 4 is a circuit diagram illustrating the structure of unit pixels that may be provided in the display device of FIG. 1 in accordance with an embodiment.

As noted briefly above, the display 18 represented in the embodiments of FIGS. 1-3 may be a liquid crystal display (LCD). FIG. 4 represents a circuit diagram of the display 18 when the display 18 is such an LCD, in accordance with an embodiment. As shown, the display 18 may include an LCD display panel 40. The display panel 40 may include multiple unit pixels 42 disposed in a pixel array or matrix defining multiple rows and columns of unit pixels that collectively form an image viewable region of the display 18. In such an array, each unit pixel 42 may be defined by the intersection of rows and columns, represented here by the illustrated gate lines 44 (also referred to as "scanning lines") and source lines 46 (also referred to as "source lines"), respectively. Each of the gate lines 44 and source lines 46 may supply a signal to the unit pixels 42 powered by a display panel power supply 76.

Although only six unit pixels, referred to individually by the reference numbers 42*a*-42*f*, respectively, are shown for purposes of simplicity, it should be understood that in an actual implementation, each source line 46 and gate line 44 may include hundreds or even thousands of such unit pixels 42. By way of example, in a color display panel 40 having a display resolution of 1024×768, each source line 46, which may define a column of the pixel array, may include 768 unit pixels, while each gate line 44, which may define a row of the pixel array, may include 1024 groups of unit pixels, wherein each group includes a red, blue, and green pixel, thus totaling 3072 unit pixels per gate line 44. By way of further example, the panel 40 may have a display resolution of 480×320 or, alternatively, 960×640. In the presently illustrated example, the group of unit pixels 42*a*-42*c* may represent a group of pixels having a red pixel (42*a*), a blue pixel (42*b*), and a green pixel (42*c*). The group of unit pixels 42*d*-42*f* may be arranged in a similar manner. With such a potentially large number of unit pixels 42 coupled to a gate line 44 or source line 46, even slight variations in the amount of supply current drawn by individual pixels may translate into significant changes in the total supply current drawn across the gate line 44 or source line 46.

As shown in the present embodiment, each unit pixel 42*a*-42*f* includes a thin film transistor (TFT) 48 for switching a respective pixel electrode 50. In the depicted embodiment, the source 52 of each TFT 48 may be electrically connected to a source line 46. Similarly, the gate 54 of each TFT 48 may be electrically connected to a gate line 44. Furthermore, the drain 56 of each TFT 48 may be electrically connected to a respective pixel electrode 50. Each TFT 48 serves as a switching element which may be activated and deactivated (e.g., turned on and off) for a predetermined period based upon the respective presence or absence of a scanning signal at the gate 54 of the TFT 48. The act of toggling the TFT 48 may cause the amount of supply current drawn from the display panel power supplies 76 to vary.

Figure 5:
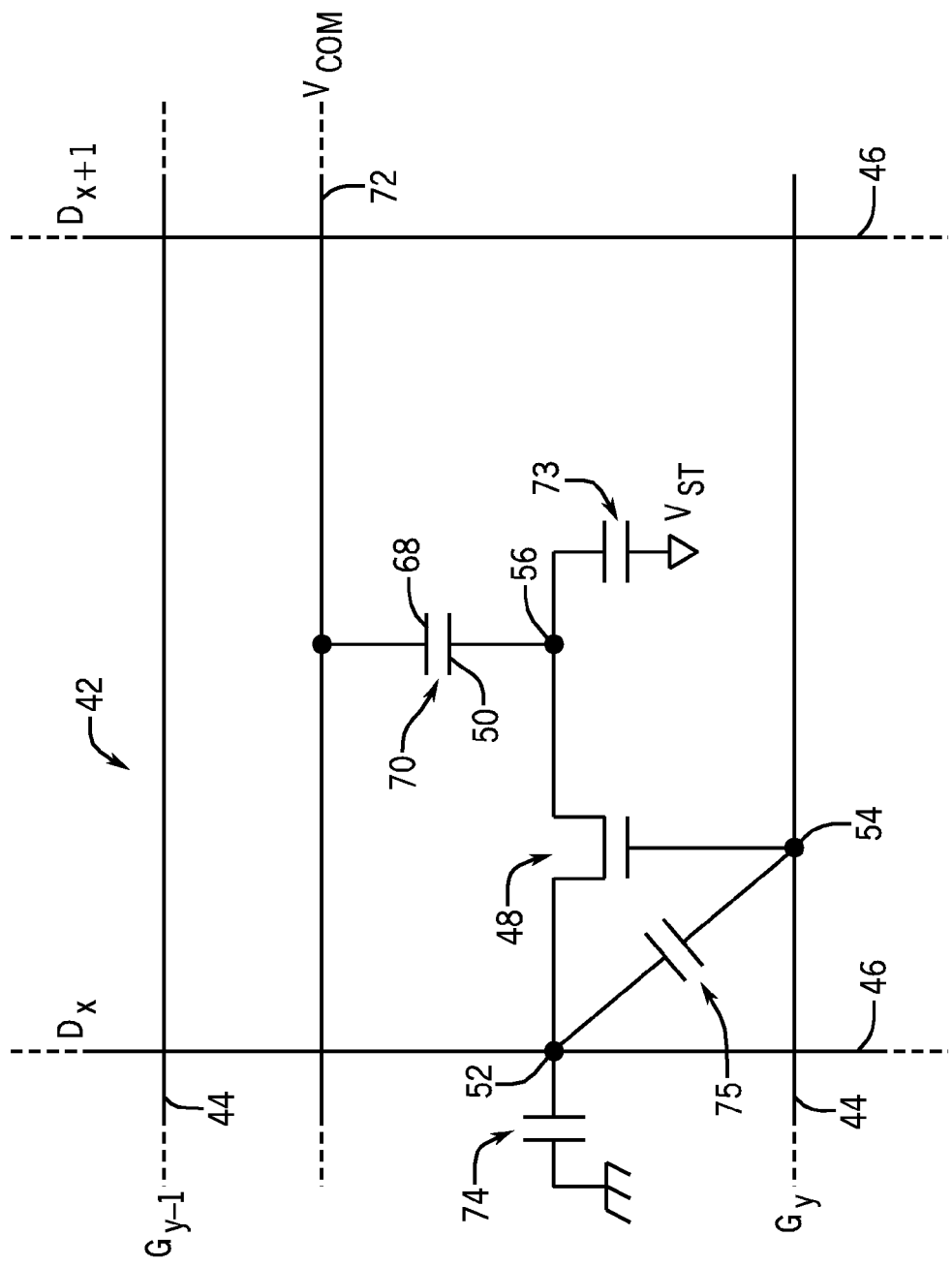
FIG. 5 is a circuit diagram depicting a single unit pixel in accordance with an embodiment.

When activated, the TFT 48 may store the image signals received via a respective source line 46 as a charge upon its corresponding pixel electrode 50. The image signals stored by pixel electrode 50 may be used to generate an electrical field between the respective pixel electrode 50 and a common electrode (not shown in FIG. 5). The reception of the image signal onto the pixel electrode 50 may also cause the amount of current drawn across the source line to vary, albeit temporarily. As a result of the electrical field between the respective pixel electrode 50 and the common electrode, the pixel electrode 50 and the common electrode may form a liquid crystal capacitor for a given unit pixel 42. Thus, in an LCD panel 40, such an electrical field may align liquid crystals molecules within a liquid crystal layer to modulate light transmission through a region of the liquid crystal layer that corresponds to the unit pixel 42. For instance, light is typically transmitted through the unit pixel 42 at an intensity corresponding to the applied voltage (e.g., from a corresponding source line 46).

The display 18 may also include a source driver integrated circuit (source driver IC) 58, which may include a chip, such as a processor or ASIC, that is configured to control various aspects of display 18 and panel 40. For example, the source driver IC 58 may receive image data 60 from the processor(s) 12 and send corresponding image signals to the unit pixels 42 of the panel 40 powered by a display panel power supply 76. The source driver IC 58 may also be coupled to a gate driver IC 62, which may be configured to activate or deactivate rows of unit pixels 42 via the gate lines 44. As such, the source driver IC 58 may send timing information, shown here by reference number 64, to gate driver IC 62 to facilitate activation/deactivation of individual rows of pixels 42. In other embodiments, timing information may be provided to the gate driver IC 62 in some other manner. While the illustrated embodiment shows only a single source driver IC 58 coupled to panel 40 for purposes of simplicity, it should be appreciated that additional embodiments may utilize multiple source driver ICs 58 for providing image signals to the pixels 42. For example, additional embodiments may include multiple source driver ICs 58 disposed along one or more edges of the panel 40, wherein each source driver IC 58 is configured to control a subset of the source lines 46 and/or gate lines 44.

In operation, the source driver IC 58 receives image data 60 from the processor(s) 12 or a separate display controller and, based on the received data, outputs signals to control the pixels 42. For instance, to display image data 60, the source driver IC 58 may adjust the voltage of the pixel electrodes 50 (abbreviated in FIG. 2 as P.E.) one row at a time. To access an individual row of pixels 42, the gate driver IC 62 may send an activation signal to the TFTs 48 associated with the particular row of pixels 42 being addressed. This activation signal may render the TFTs 48 on the addressed row conductive. Accordingly, image data 60 corresponding to the addressed row may be transmitted from source driver IC 58 to each of the unit pixels 42 within the addressed row via respective source lines 86. Thereafter, the gate driver IC 62 may deactivate the TFTs 48 in the addressed row, thereby impeding the pixels 42 within that row from changing state until the next time they are addressed. The above-described process may be repeated for each row of pixels 42 in the panel 40 to reproduce image data 60 as a viewable image on the display 18. In general, these events may take place at certain points in time, namely, upon the rising edge and/or falling edge of a clock signal 66 from the system clock 28.

Figure 6:
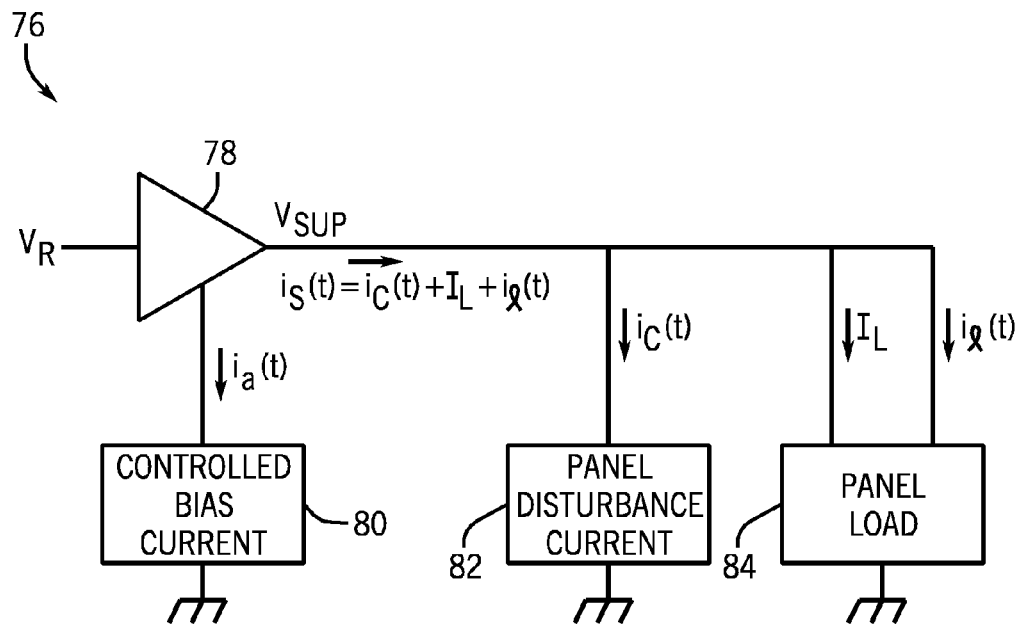
FIG. 6 is a circuit diagram illustrating a power supply of the display in accordance with an embodiment.

FIG. 6 represents a circuit diagram of an embodiment of a pixel 42 in greater detail. As shown, the TFT 48 is coupled to the source line 46 ($D_x$) and the gate line 44 ($G_y$). The pixel electrode 50 and the common electrode 68 may form a liquid crystal capacitor 70. The common electrode 68 is coupled to a common voltage line 72 that supplies the common voltage $V_{COM}$. The $V_{COM}$ line 72 may be formed parallel to the gate lines 44 or, in other embodiments, parallel to the source lines 46. The voltage supplied on the $V_{COM}$ line 72 may be supplied by a display panel power supply 76, which may operate according to embodiments discussed below.

In the present embodiment, the pixel 42 also includes a storage capacitor 73 having a first electrode coupled to the drain 56 of the TFT 48 and a second electrode coupled to a storage electrode line that supplies a storage voltage $V_{ST}$. In other embodiments, the second electrode of the storage capacitor 73 may be coupled instead to the previous gate line 44 (e.g., $G_{y-1}$) or to ground. The storage capacitor 73 may sustain the pixel electrode voltage during holding periods (e.g., until the next time the gate line 44 ($G_y$) is activated by the gate driver IC 62. Other capacitances associated with the pixel 42 may include a parasitic coupling capacitor 74 and/or a parasitic capacitor 75 between the source 52 and the gate 54 of the TFT 48. The capacitances of the pixel 42 may cause the supply currents provided by the relevant display panel power supplies 76 to quickly and temporarily increase and/or decrease when toggling occurs at the $V_{COM}$ line 72, the source lines 46, and/or the gate lines 44.

As noted above, the currents resulting from such capacitances may cause the components of the display panel 18 to draw more or less supply current $i_s(t)$ from the display panel power supplies 76 at any given time. These current fluctuations may also depend upon on certain characteristics of the display 18 (e.g., which vendor manufactured the display 18). Despite such current fluctuations, the power supplies 76 of the display 18 may provide supply currents $i_s(t)$ to the components of the display 18 in a low-power, responsive manner. FIG. 6 illustrates one such display panel power supply 76, which includes a low dropout (LDO) regulator 78 that outputs a supply voltage $V_{SUP}$ and the supply current $i_s(t)$ based on a reference voltage $V_R$ and a bias current $i_a(t)$. The bias current $i_a(t)$ may be provided so as to lower the power consumption of the LDO regulator 78, while permitting the LDO regulator 78 to remain responsive.

To this end, the display panel power supply 76 may control the bias current $i_a(t)$ (e.g., block 80) to provide a bias current high enough to be enable the display panel power supply 76 to be suitably responsive when the amount of supply current $i_s(t)$ drawn by the display 18 undergoes changes, while providing a bias current low enough to suitably conserve power at other times. In particular, the supply current $i_s(t)$ may represent the sum of current due to capacitive coupling $i_c(t)$, which may arise due to capacitive coupling internal to the display 18 (e.g., block 82), and the panel load currents (e.g., block 84), representing a DC panel load component $I_L$ and a time-varying panel load component $i_f(t)$, (e.g., $i_s(t)=i_c(t)+I_L+i_f(t)$). When the capacitive coupling current $i_c(t)$ and/or the time-varying panel load component $i_f(t)$ change by increasing or decreasing, the bias current $i_a(t)$ may be increased to enable the LDO regulator 78 to respond more rapidly to the change in supply current $i_s(t)$ being drawn.

Figure 7:
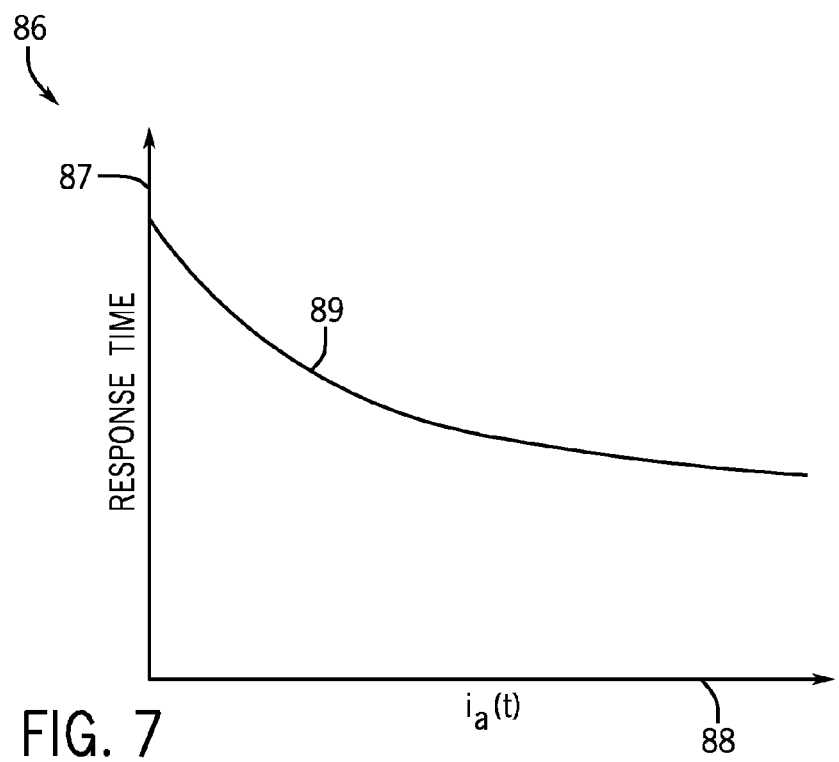
FIG. 7 is a plot illustrating a relationship between a bias current and the responsiveness of the power supply of FIG. 6 in accordance with an embodiment.

As mentioned above, the amount of bias current $i_a(t)$ provided to the regulator 78 impacts its responsiveness to the capacitive coupling currents $i_c(t)$. FIG. 7 presents a plot 86 relating the relative response time of the regulator 78 (ordinate 87) and the bias current $i_a(t)$ provided to the regulator 78 (abscissa 88). In general, as shown by a response curve 89, the response time of the regulator 78 may decrease as the bias current increases, to a point of diminishing returns. That is, the regulator 78 may respond to increases or decreases in supply current $i_s(t)$ more rapidly when the bias current $i_a(t)$ is relatively higher than when the bias current $i_a(t)$ is relatively lower.

Figure 8:
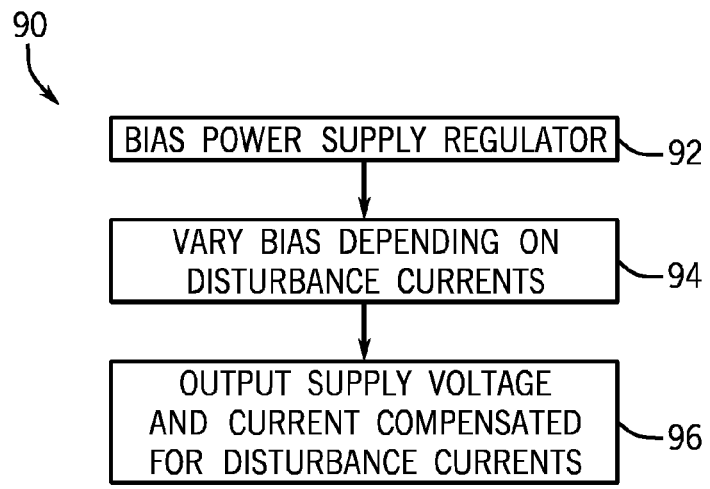
FIG. 8 is a flowchart describing an embodiment of a method for providing an optimized bias current to an electronic device.

By varying the bias current $i_a(t)$ at suitable times, the display panel power supply 76 may provide power to a component of the display 18 in a low-power but responsive manner, as illustrated by a flowchart 90 of FIG. 8. The embodiment of the method shown in flowchart 90 may begin when a bias current $i_a(t)$ is provided to the LDO regulator 78 (block 92). Depending on the capacitive coupling current $i_c(t)$ and other time-varying currents that draw power from the display panel power supply 76 (e.g., $i_f(t)$), the bias current $i_a(t)$ may be varied (block 94). In general, the bias current $i_a(t)$ may be varied such that increases and/or decreases in the amount of supply current $i_s(t)$ drawn by the display 18 are accompanied by increases in bias current $i_a(t)$. As discussed below, the action taken in block 94 may involve a variety of techniques, including detecting and responding to changes in supply current $i_s(t)$ and/or predicting such changes and preemptively increasing the bias current $i_a(t)$. Thereafter, the LDO regulator 78 may respond in a suitably responsive manner by maintaining the supply voltage $V_{SUP}$ despite changes in the supply current $i_s(t)$ (block 96).

Figure 9:
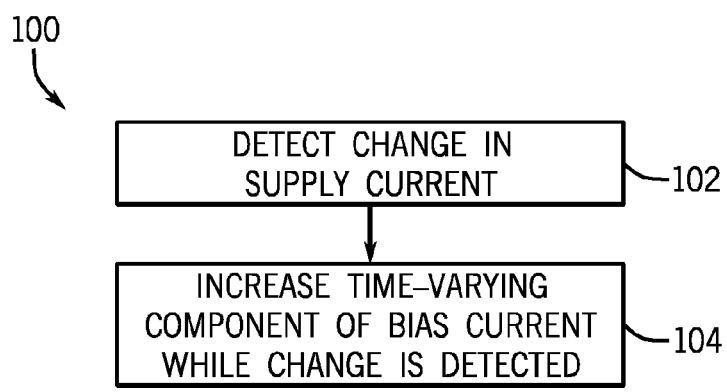
FIG. 9 is a flowchart describing an embodiment of a method for varying a bias current of a display panel power supply based on a detected change in supply current.

As noted above, one manner of varying the bias current $i_a(t)$ may involve detecting and responding to changes in supply current $i_s(t)$. One embodiment of such a method is represented by a flowchart 100 of FIG. 9, which may begin by detecting a change in the amount of supply current $i_s(t)$ being drawn by a component of the display panel 18 (block 102). When a change in the amount of supply current $i_s(t)$ is detected, a time-varying component of the bias current $i_a(t)$ may be increased (block 104) to enable the LDO regulator 78 to respond in a suitably responsive manner. In some embodiments, the method of the flowchart 100 may be carried out using current-sensing circuitry, which may detect and digitize the supply current $i_s(t)$. Thereafter, the processor(s) 12 or another integrated circuit (IC) may monitor the supply current $i_s(t)$ for rapid changes, sending a signal to increase the bias current $i_a(t)$ when changes are detected and/or to lower the bias current $i_a(t)$ when the supply current $i_s(t)$ is stable.

Figure 10:
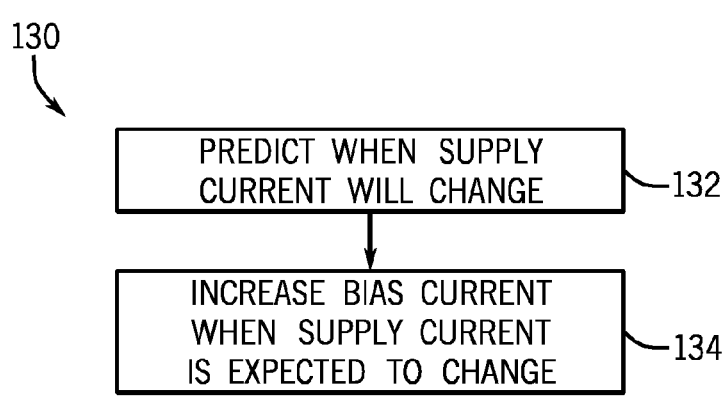
FIG. 10 is a flowchart describing an embodiment of a method for varying a bias current of a display panel power supply depending on a predicted supply current change in accordance with an embodiment.

FIG. 10 is a flowchart 130 presenting an additional or alternative manner of varying the bias current $i_a(t)$, which may involve predicting changes in the supply current $i_s(t)$ and preemptively increasing the bias current $i_a(t)$ as a result. The flowchart 130 may begin by predicting when a change in the amount of supply current $i_s(t)$ being drawn by the display panel 18 will occur (block 132). When a change in the amount of supply current $i_s(t)$ is expected, a time-varying component of the bias current $i_a(t)$ may be increased (block 134) to enable the LDO regulator 78 to respond in a suitably responsive manner.

Figure 11:
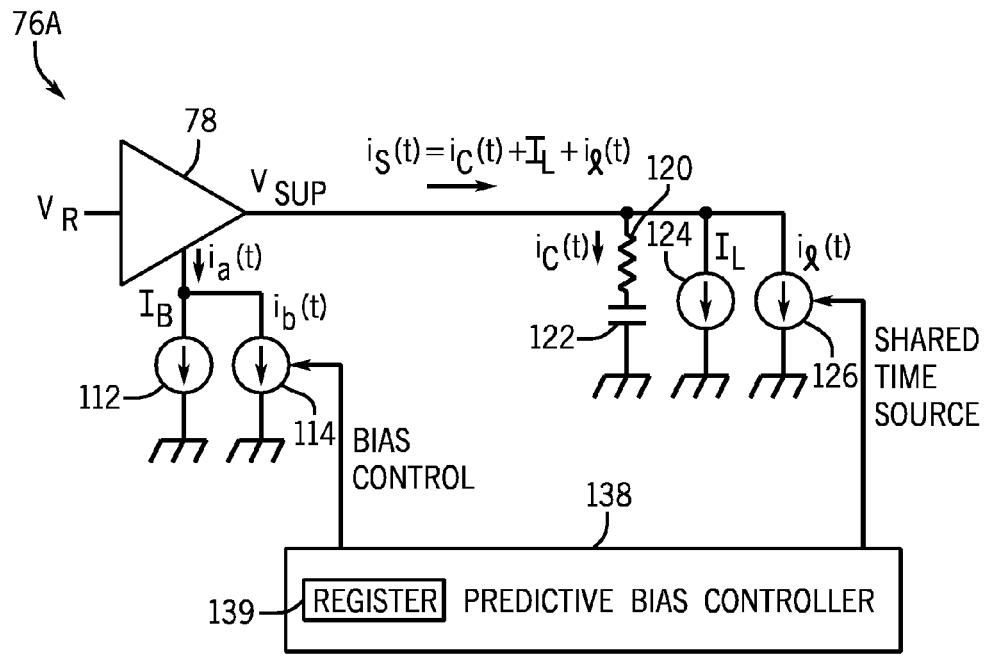
FIG. 11 is a circuit diagram depicting one manner of performing the method of FIG. 10 in accordance with an embodiment.

FIG. 11 depicts a display panel power supply 76A, which represents one embodiment of the display panel power supply 76 that is configured to carry out an embodiment of the method of FIG. 10. As shown in FIG. 11, the LDO regulator 78 may output the supply voltage $V_{SUP}$ and the supply current $i_s(t)$ based on the reference voltage $V_R$ and the bias current $i_a(t)$. As noted above, the bias current $i_a(t)$ may be represented by two components, a DC component $I_B$ and a time-varying component $i_b(t)$, respectively modeled by the current sources 112 and 114. The current source 114 may be a variable current source controlled by a signal BIAS CONTROL output by a predictive bias controller 138. The predictive bias controller 138 may output the BIAS CONTROL signal to cause the bias current $i_a(t)$ to increase when the supply current $i_s(t)$ is expected to change.

Figure 13:
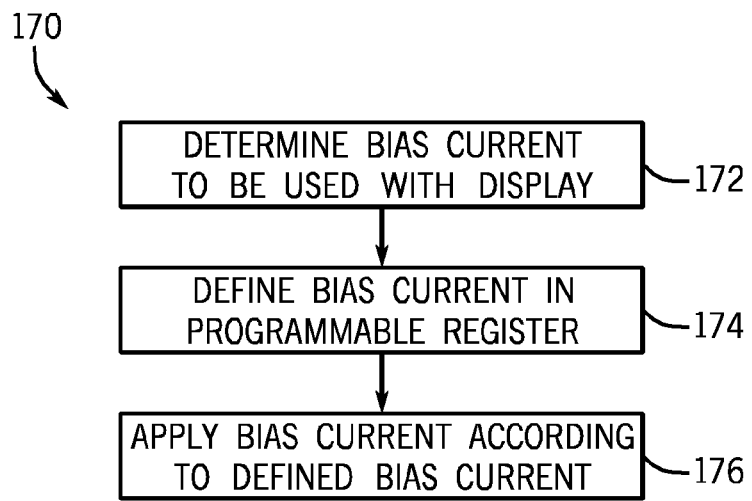
FIG. 13 is a flowchart describing an embodiment of a method for providing a static bias current to a display panel power supply.

In the depicted embodiment of the display panel power supply 76A, the supply current $i_s(t)$ is equal to the sum of the capacitive coupling current $i_c(t)$, the DC panel load component $I_L$ and the time-varying panel load component $i_f(t)$ (e.g., $i_s(t)=i_c(t)+I_L+i_f(t)$). The capacitive coupling current $i_c(t)$ is modeled as arising due to capacitive coupling in the display 18 through the resistive element 120 and the capacitive element 122. The DC panel load component $I_L$ and the time-varying panel load component $i_f(t)$ are respectively modeled as arising due to the current sources 124 and 126. The predictive bias controller 138 may control the bias current $i_a(t)$ in part due to a manner in which the time-varying panel load component $i_f(t)$ may behave in relationship to a time source shared by the predictive bias controller 138 and the current source 126 (shown as a signal SHARED TIME SOURCE). A programmable register 139 may store values that define the DC component $I_B$ and/or the maximum or minimum time-varying component $i_b(t)$ of the bias current $i_a(t)$, as discussed below with reference to FIG. 13.

The predictive bias controller 138 may predict when the supply current $i_s(t)$ is expected to change in a variety of ways. For example, the predictive bias controller 138 or the processor(s) 12 may record when changes in the supply current $i_s(t)$ have historically taken place. When conditions similar to conditions historically associated with changes in the supply current $i_s(t)$ occur (e.g., the network interface(s) 24 are expected to transmit data), the predictive bias controller 138 or the processor(s) 12 may expect that similar changes in the supply current $i_s(t)$ are likely to occur again. When such changes in the supply current $i_s(t)$ are expected by the predictive bias controller 138 or the processor(s) 12, the predictive bias controller 138 may adjust the bias current $i_a(t)$ accordingly.

Figure 12:
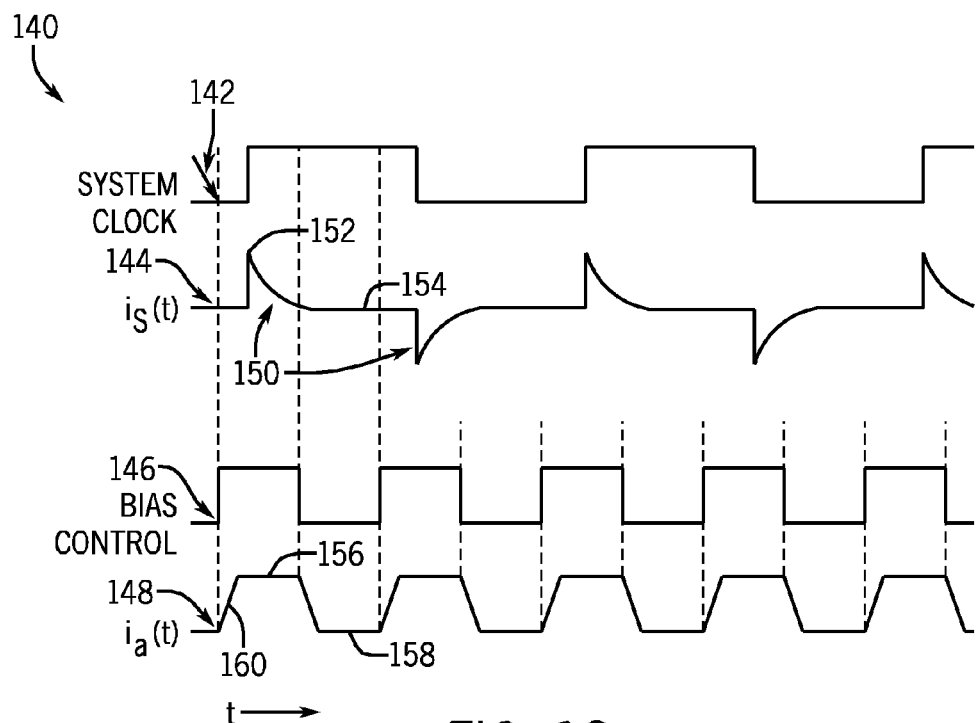
FIG. 12 is a timing diagram illustrating a relationship between the bias current and system clock in the circuit depicted in FIG. 11 in accordance with an embodiment.

In certain embodiments, the predictive bias controller 138 may expect the supply current $i_s(t)$ to change based on timing associated with the system clock 28 of the electronic device. As illustrated by a timing diagram 140 of FIG. 12, time-varying components of the supply current $i_s(t)$ may correspond to rising and/or falling edges of the system clock 28, and thus the predictive bias controller 138 may control the bias current $i_a(t)$ accordingly. In the timing diagram 140, a curve 142 represents a system clock of the electronic device 10, a curve 144 represents the supply current $i_s(t)$ drawn by the display 18, a curve 146 represents the signal BIAS CONTROL output by the predictive bias controller 138, and a curve 148 represents the total bias current $i_a(t)$.

As represented by the curves 142 and 144, the supply current $i_s(t)$ may change most dramatically at the rising and/or falling edges of the SYSTEM CLOCK SIGNAL, as indicated by numerals 150. Specifically, the supply current may reach a minimum or a maximum (e.g., at numeral 152) due to dynamic current (e.g., $i_c(t)+i_f(t)$) arising from capacitive coupling when certain events occur that are latched to the system clock. For example, toggling at the $V_{COM}$ line 72, the source lines 46, and/or the gate lines 44 generally may take place at the rising edge and/or falling edge of the SYSTEM CLOCK signal. Such toggling may cause the parasitic capacitances 75 of the display 18 to draw additional supply current $i_s(t)$ through the lines 72, 46, and 44 at these times. These dynamic current swings (e.g., spike currents) shown at numerals 150 may be based around the DC panel load current $I_L$ (e.g., at numeral 154).

To ensure that the LDO regulator 78 is suitably responsive during the dynamic current swings (e.g., at numerals 150), the predictive bias controller 138 may output the BIAS CONTROL signal such that the bias current $i_a(t)$ ramps up to a relatively higher bias current (e.g., at numeral 156) before such dynamic current swings 150. This relatively higher bias current 156 generally may remain in place while the dynamic current swings 150 take place. Similarly, at other times when the dynamic current swings 150 are not taking place (e.g., at numeral 154), the bias current $i_a(t)$ may be reduced to a relatively lower bias current (e.g., at numeral 158). In this manner, the variability of the bias current $i_a(t)$ may enable the LDO regulator 78 to achieve a suitable responsiveness when the supply current $i_s(t)$ is expected to change (e.g., upon rising and/or falling edges of the SYSTEM CLOCK signal), while reducing excess power consumed due to the bias current $i_a(t)$ when the supply current $i_s(t)$ is expected to remain stable.

In alternative embodiments, a slope 160 of the bias current $i_a(t)$ may be higher or lower, depending on the components employed in the variable current source 114. For instance, a higher slope may be achieved using more expensive components, which may allow a shorter bias current $i_a(t)$ duty cycle. In other words, if even further reductions in power consumption are desired, a higher slope 160 may enable a shorter duty cycle at the cost of more expensive components. In some embodiments, the slope and/or the duty cycle of the bias current $i_a(t)$ may be register programmable.

Figure 14:
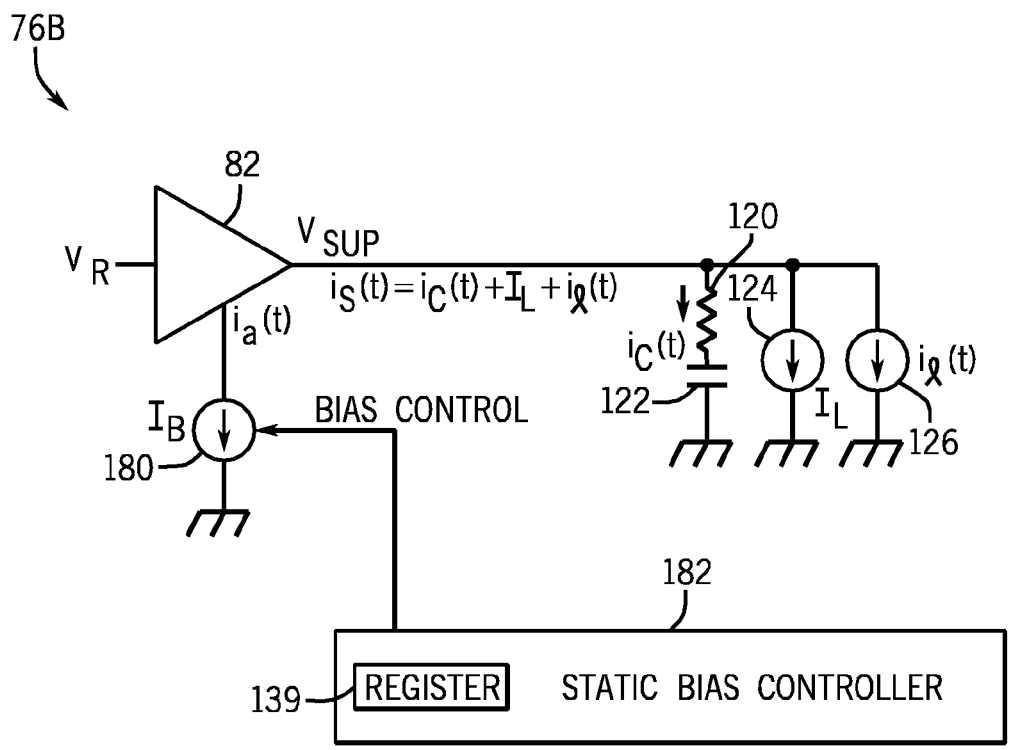
FIG. 14 is a circuit diagram depicting one manner of performing the method of FIG. 13 in accordance with an embodiment.

Moreover, because certain displays 18 may have certain supply current consumption characteristics, the DC component $I_B$ (or a maximum or minimum time-varying component $i_b(t)$) of the bias current $i_a(t)$ may be defined in a programmable register associated with a bias current controller (e.g., the predictive bias controller 138 of FIG. 11 or the static bias controller 182 of FIG. 14) of the display panel power supply 76. As illustrated in a flowchart 170 of FIG. 13, certain supply current consumption characteristics of the display 18 may be assessed, and the bias current $i_a(t)$ to be employed by the display panel power supply 76 may be ascertained (block 172). By way of example, vendors may test the displays 18 for various operating characteristics during or after the manufacture of the displays 18. These characteristics may include, among other things, the variability of the amount of supply current $i_s(t)$ drawn during certain operations. In some embodiments, the DC component $I_B$ or a maximum or minimum time-varying component $i_b(t)$ of the bias current $i_a(t)$ may be selected from among several discrete values (e.g., low, medium, or high).

Next, the determined bias current $i_a(t)$ value(s) may be programmed into the programmable register 139 associated with the bias current controller of the display panel power supply 76 in the electronic device 10 (block 174). For example, the programmable register 139 may store values associated with the DC component $I_B$ and/or the maximum or minimum time-varying component $i_b(t)$ of the bias current $i_a(t)$. Thereafter, the bias current $i_a(t)$ provided to the regulator 78 may be defined according to the values stored in the programmable register 139 (block 176).

In certain embodiments, the bias current $i_a(t)$ provided to the regulator 78 may not change with time, but rather may be static. For example, as illustrated by a display panel power supply 76B of FIG. 14, which represents another embodiment of the display panel power supply 76, a variable current source 180 may provide a DC component $I_B$ of the bias current $i_a(t)$, which may lack a time-varying component $i_b(t)$. The variable current source 180 may be controlled via a signal BIAS CONTROL provided by a static bias controller 182. The static bias controller 182 may output the BIAS CONTROL signal based on a value stored in a programmable register 139 associated with the static bias controller 182. In this manner, the DC component $I_B$ of the bias current $i_a(t)$ may vary from one display 18 to another, without need for different electrical components to supply such different bias currents $i_a(t)$.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A power supply comprising:
a regulator configured to output a supply current to a display panel based at least in part on a bias current;
a current source configured to provide the bias current to the regulator, wherein the bias current is configured to be at a relatively higher current at least while the amount of the supply current output by the regulator is expected to change than at other times; and
a predictive bias current circuitry configured to predict when the amount of the supply current is expected to change due to electrical changes expected to occur in the display panel, wherein the predictive bias current circuitry is configured to predict that the amount of supply current is expected to change:
when capacitive coupling currents are generated in parasitic capacitors of the display panel; or
upon a rising edge of a clock signal edge of the clock signal; or
when an electronic component proximate to the display panel undertakes or is about to undertake an operation;
or any combination thereof.

2. The power supply of claim 1, wherein the bias current provided to the regulator by the current source is configured to be at the relatively higher current before the amount of supply current changes and to remain the relatively higher current while the amount of supply current is changing.

3. The power supply of claim 1, wherein the predictive bias current control circuitry is configured to control the current source such that the bias current is at a relatively lower current when the predictive bias current control circuitry predicts that the amount of supply current is expected to be stable than when the predictive bias current control circuitry predicts that the amount of supply current is expected to change.

4. The power supply of claim 1, wherein the predictive bias current control circuitry is configured to predict that the supply current is expected to change based at least in part on a time source shared by the display panel and the predictive bias current control circuitry.

5. A method comprising:
providing a supply current and a supply voltage to a display panel using a low dropout regulator, wherein the supply current is generated based at least in part on a first bias current or a second bias current provided to the low dropout regulator;
predicting that the amount of supply current to the display panel is expected to change based on electrical changes expected to occur in the display panel using a bias current controller, wherein the bias current controller is configured to predict that the amount of supply current is expected to change:
when capacitive coupling currents are generated in parasitic capacitors of the display panel; or upon a rising edge of a clock signal edge of the clock signal; or when an electronic component proximate to the display panel undertakes or is about to undertake an operation;

or any combination thereof;

providing the first bias current to the low dropout regulator using the bias current controller at least before and while the supply current to the display panel is expected to change; and providing the second bias current to the low dropout regulator using the bias current controller at all other times.

6. The method of claim 5, wherein the first bias current is higher than the second bias current.

7. The method of claim 5, wherein the first bias current is provided to the low dropout regulator after the supply current to the display panel is expected to change.

8. The method of claim 5, wherein the supply current is provided by the low dropout regulator in a more responsive manner when the first bias current is provided to the low dropout regulator than when the second bias current is provided to the low dropout regulator.

9. An electronic device comprising:

means for providing a supply current and a supply voltage to a display panel, wherein the supply current is generated based at least in part on a first bias current or a second bias current;

means for predicting that the amount of supply current to the display panel is expected to change based on electrical changes expected to occur in the display panel, wherein the means for predicting is configured to predict that the amount of supply current is expected to change:

when capacitive coupling currents are generated in parasitic capacitors of the display panel; or upon a rising edge of a the clock signal; or a falling edge of the clock signal; or when an electronic component proximate to the display panel undertakes or is about to undertake an operation;

or any combination thereof;

means for providing the first bias current at least before and while the supply current to the display panel is expected to change; and means for providing the second bias current at all other times.

10. The electronic device of claim 9, wherein the first bias current is higher than the second bias current.

11. The electronic device of claim 9, wherein the first bias current is provided after the supply current to the display panel is expected to change.

12. The electronic device of claim 9, wherein the supply current is provided in a more responsive manner when the first bias current is provided than when the second bias current is provided.

* * * * *

UNITED STATES PATENT AND TRADEMARK OFFICE
CERTIFICATE OF CORRECTION

| | | |
|---|---|---|
| PATENT NO. | : 8,988,408 B2 | Page 1 of 1 |
| APPLICATION NO. | : 12/839104 | |
| DATED | : March 24, 2015 | |
| INVENTOR(S) | : Yongman Lee | |

It is certified that error appears in the above-identified patent and that said Letters Patent is hereby corrected as shown below:

Claims

In Column 12, line 31, (Claim 1), insert the phrase --or a falling-- between the words "signal" and "edge".

In Column 13, line 1, (Claim 5), insert the phrase --or a falling-- between the words "signal" and "edge".

Signed and Sealed this
Twenty-eighth Day of July, 2015

Michelle K. Lee
*Director of the United States Patent and Trademark Office*